Patented Aug. 20, 1940

2,211,992

UNITED STATES PATENT OFFICE 2,211,992

COATING COMPOSITION

Peter A. van der Meulen, New Brunswick, N. J., assignor to John R. Ditmars, New Brunswick, N. J.

No Drawing. Application January 27, 1937, Serial No. 122,659

4 Claims. (Cl. 134—12)

The invention herein disclosed relates to a grease-resistant, film-forming coating composition suitable for coating sheet material and it includes the coated sheet material.

For certain purposes, it is desirable to render sheet material that is ordinarily permeable to grease, grease-resistant or grease-proof. An example of this is found in the packaging industry where it is necessary to wrap grease containing materials in paper or paper board containers. Heretofore, it has been necessary to provide at least two wrappers for such material, a specially treated wrapper such as wax paper and the outer wrapping or paper board container.

An object of this invention is to provide a coating composition that may be applied to a paper container or other similar sheet material and a coated sheet material that resists penetration by grease. Another object of the invention is to provide such a coating composition that when applied to a sheet material enhances the appearance thereof so that there is provided a coated sheet material that not only resists penetration by grease but which has a surface that is superior in appearance to the uncoated sheet material.

These and other objects, and certain advantages of the invention that will hereinafter more fully appear, are obtained by providing a film-forming coating composition which when applied to the surface of a pervious sheet material forms a thin continuous film thereon that resists penetration by grease and moisture. Such a coating composition may be made in accordance with this invention by forming a film-forming emulsion to which there is added a material that renders the film-forming emulsion such that it resists penetration by grease. The film-forming emulsion may be made with a base material of either gelatin or casein or a mixture of these. These are mixed with water and to the emulsion that is formed the substance that renders the film resistant to grease is added. This latter substance may be either a glycerine phthalate ester or a glycol phthalate ester. This composition, in the coating operation, is drawn out to form a thin, smooth, continuous film that lies upon and adheres to the surface of the sheet material on which it forms a coating. The coated surface is glossy and has a luster that is pleasing to the sense of sight. It may be rendered smoother by being pressed into intimate contact with a smooth polished surface, but this is an optional addition.

A gelatin base film-forming composition embodying this invention may be made up in accordance with the following example which will serve to illustrate the proportions of the various ingredients and the procedure followed: 200 grams of gelatin, a blended gelatin may be used, is swelled with 250 grams of water over night. The mixture is melted at 140 degrees F. and the following materials are added in the order and the amounts given:

(a) Sulphonated oil (Monosulph)_____gms__ 33
    Glycerine phthalate ester_____gms__ 90
(b) Water_____gms__ 90
    Ammonia_____cc__  8
(c) Phenol, 5 percent soln_____cc__ 24
(d) Butyl alcohol_____cc__ 44
(e) Acetic acid_____cc__  6

The sulphonated oil used is a sulphonated castor oil known to the trade as "Monosulph." Other similar sulphonated vegetable oils are also suitable. The sulphonated oil while not a necessary ingredient is desirable as it makes the film formed by the emulsion more flexible.

The glycerine phthalate ester mentioned above is a non-resinous or partially condensed, soluble form of phthalate ester. This product may be obtained by heating a mixture of equal amounts of glycerine and phthalic anhydride, for example, a mixture of 148 grams of glycerine and 148 grams of phthalic anhydride, for a period of approximately two and one-half hours at a temperature between 140 and 150 degrees C. A similar non-resinous phthalate ester that may be substituted in equal parts for the glycerine phthalate ester is a glycol phthalate ester. This product may be obtained by heating, for example, a 62 gram portion of ethylene glycol with 148 grams of phthalic anhydride at a temperature 150–160 degrees C. for a period of about two hours. The phthalate ester so prepared is mixed with water and ammonia as indicated above and this is added to the mixture of gelatin, water and sulphonated oil. The glycerine phthalate ester or its equivalent renders the composition resistant to the penetration of grease when it is drawn out into a thin flexible film. The ammonia is required to get the phthalate ester into solution.

The acetic acid and butyl alcohol, secondary butyl alcohol, are not essential but they are desirable additions. The phenol is a preservative and any other preservative such as beta-naphthol may be substituted for it.

It is to be noted that this composition as given above contains approximately 430 grams of volatile matter to 320 grams of non-volatile matter, a ratio of approximately 1.3 parts of volatile matter, principally water, to one part of non-volatile matter. This constitutes a material advantage for when the composition is used as a coating composition, the volatile matter must be removed as by a drier and the lower the quantity of volatile matter in relation to the non-volatile matter, the less expensive is the equipment necessary to remove the volatile matter per unit of coated surface.

A casein base film-forming composition embodying the invention may be prepared by mixing, for example, 200 grams of casein with 200 grams of water and letting the mixture stand for approximately two hours. To this mixture of casein and water there is then added a mixture of 25 grams of borax in 200 grams of water and the resultant mixture is heated at 160 degrees F. until melted. The following materials and mixtures are then added in the order and the quantities mentioned:

(a) Sulphonated oil_____gms__ 33
    Glycerol phthalate ester_____gms__ 90
(b) Water_____gms__ 90
    Ammonia_____cc__ 8
(c) Butyl alcohol_____cc__ 44

In this formula, a glycol phthalate ester may be substituted for the glycerol phthalate ester if desired.

Either of the film-forming emulsions are readily applied as a coating to sheet material on an ordinary papercoating machine. When the emulsion is applied the sheet is dried, these operations following one another and being continuous if desired. The coated sheet has a smooth glossy surface that resists penetration by grease; it has a pleasing appearance and it is comparatively inexpensive. If desired the coating may be laid over printed material and in such a case it enhances the depth of tone and brilliance of the printed image as the film is transparent if coloring matter is not added. The glossy character of the coated surface may be enhanced by pressing the coated surface in contact with a highly polished surface.

It will be noted that in each of the formulae given there is less than five parts of volatile matter for each part of non-volatile matter. This amount of volatile matter is readily removed by ordinary drying equipment.

It will be obvious that various changes may be made by those skilled in the art in the details of the embodiments of the invention described above within the principle and scope of the invention as expressed in the appended claims.

I claim:

1. A composition for forming a continuous film suitable for coating paper and the like, which composition comprises a base material selected from the group consisting of gelatin and casein, water, ammonia, and a partially condensed, soluble phthalate ester formed by heating a substance selected from the group consisting of glycol and glycerine with phthalic anhydride for a period not exceeding three hours at a temperature between 140 and 150 degrees C., the ratio of the evaporative matter to the non-evaporative matter in the composition being less than five to one respectively.

2. A composition for forming a continuous film suitable for coating paper and the like, which composition comprises a base selected from the group consisting of gelatin and casein, water, and a partially condensed, soluble phthalate ester formed by heating a substance selected from the group consisting of glycol and glycerine with phthalic anhydride for a period not exceeding three hours at a temperature between 140 and 150 degrees C., the ratio of the evaporative matter to the non-evaporative matter in the composition being less than five to one respectively.

3. A composition for forming a continuous film suitable for coating paper and the like, which composition comprises gelatin, water, ammonia, and a partially condensed soluble phthalate ester formed by heating a substance selected from the group consisting of glycol and glycerine with phthalic anhydride for a period not exceeding three hours at a temperature between 140 and 150 degrees C., the ratio of the evaporative matter to the non-evaporative matter in the composition being less than five to one respectively.

4. A composition for forming a continuous film suitable for coating paper and the like, which composition comprises casein, water, ammonia, and a partially condensed, soluble phthalate ester formed by heating a substance selected from the group consisting of glycol and glycerin with phthalic anhydride for a period not exceeding three hours at a temperature between 140 and 150 degrees C., the ratio of the evaporative matter to the non-evaporative matter in the composition being less than five to one respectively.

PETER A. van der MEULEN.